(No Model.)  J. F. HILL.  2 Sheets—Sheet 2.
CULTIVATOR AND SEED PLANTER.

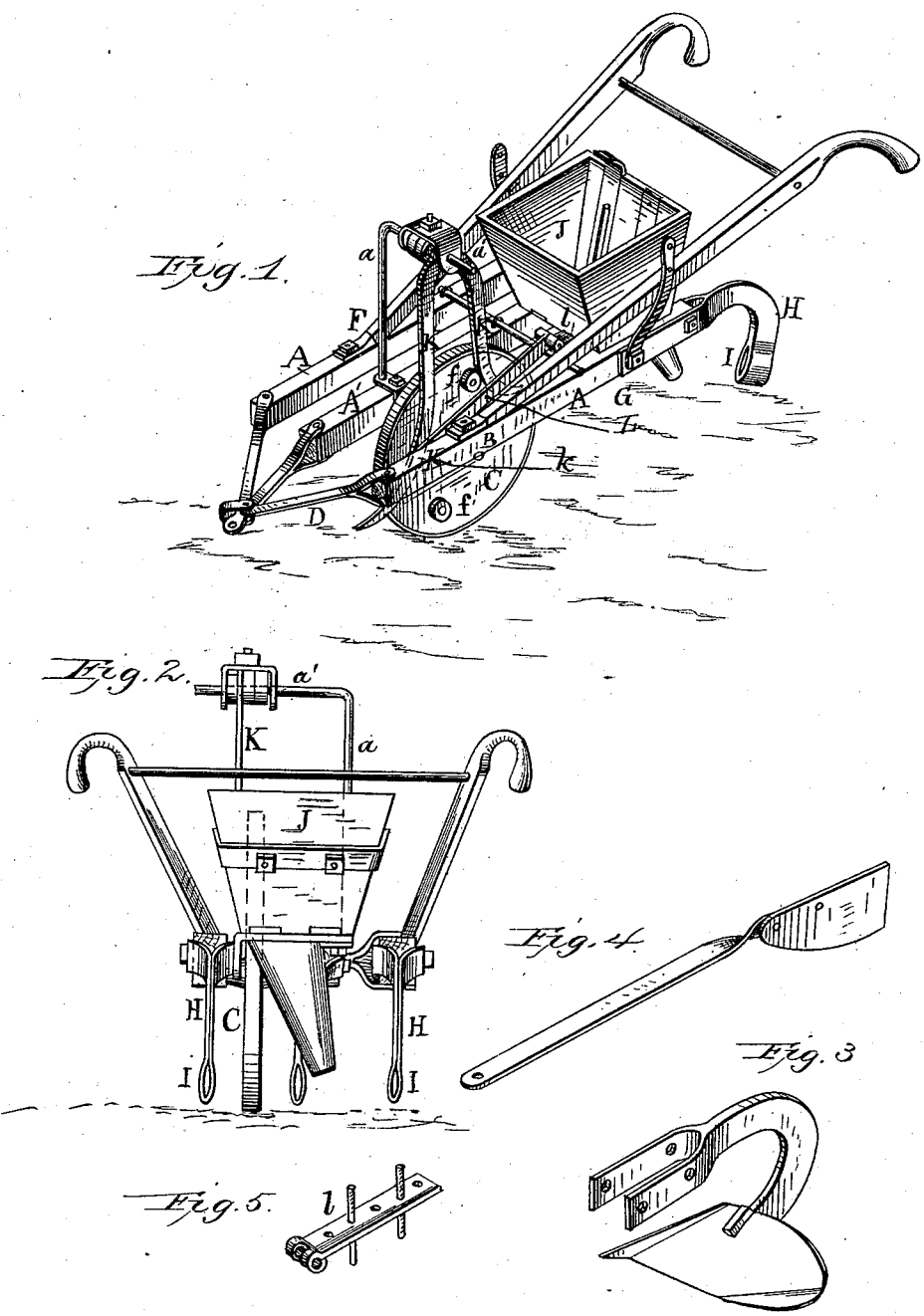

No. 281,878.  Patented July 24, 1883.

WITNESSES
H. L. Durand
Jas. L. Falhey

INVENTOR
Jas. F. Hill
By H. J. Ennis
Attorney

UNITED STATES PATENT OFFICE.

JAMES F. HILL, OF DALTON, GEORGIA.

CULTIVATOR AND SEED-PLANTER.

SPECIFICATION forming part of Letters Patent No. 281,878, dated July 24, 1883.

Application filed February 28, 1883. (No model.)

*To all whom it may concern:*

Be it known that I, JAMES F. HILL, a citizen of the United States, residing at Dalton, in the county of Whitfield and State of Georgia, have invented certain new and useful Improvements in Cultivators and Seed-Planters, of which the following is a specification, reference being had therein to the accompanying drawings.

This invention has for its object to provide a combined cultivator and seed-planter the parts of which may be adjusted to perform any variety or kind of work required, as more fully hereinafter specified. These objects I attain by the means illustrated in the accompanying drawings, in which—

Figure 6:
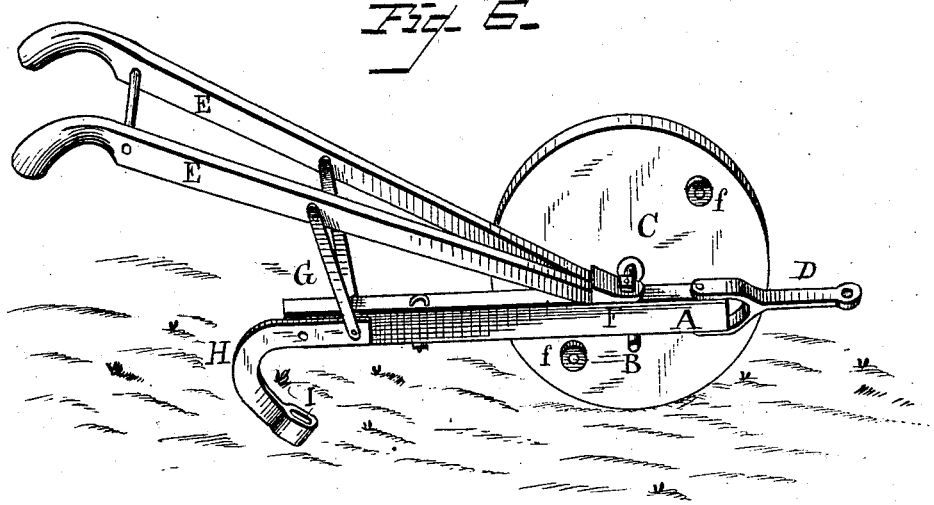
Figure 7:
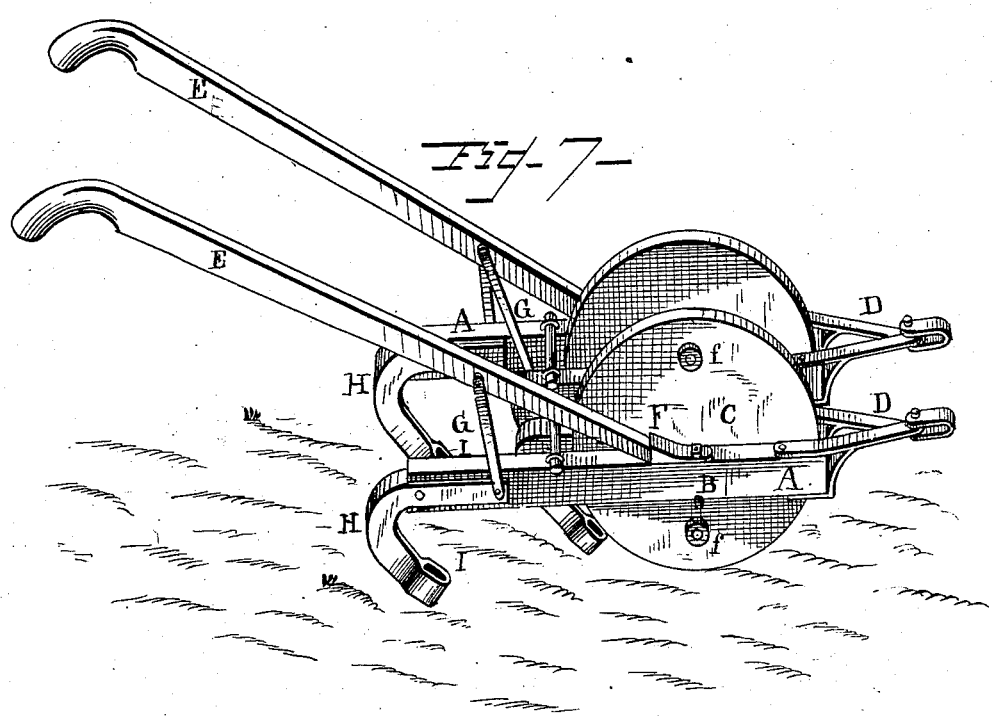

Figure 1 represents a perspective view of my improved machine entire. Fig. 2 is a rear view thereof. Fig. 3 is a detached view of the scraper-blade. Fig. 4 is a detached perspective view of a dirt-fender to be used in connection with the machine. Fig. 5 is a detached view of a slide to be employed in connection with the apparatus for distributing guano or cotton-seed. Fig. 6 represents a side elevation of the apparatus arranged as a single-row cultivator; and Fig. 7 is a perspective view of the apparatus arranged as a double-row cultivator.

The letter A indicates the main beam or beams of the apparatus. When employed as a single cultivator, as indicated in Fig. 6, but one beam is to be used, which is mounted near its forward end upon an axle, B, of the wheel C. The said beam is provided with a clevis, D, at its forward end, and with guide-handles E, which are suitably attached at their forward ends, as indicated by the letter F, and are braced immediately by the rods G. The rear end of the beam is provided with a curved connection, H, having a socket, I, at its extremity for the reception of the shanks of the plow-shares of various descriptions.

When the apparatus is to be employed as a seed-planter, unscrew all the taps on the right-hand beam of the cultivator, taking out the right-hand short beam and placing the long beam in its stead. Lay aside the short beam and wheel and place the standard $a$ upon the short beam A' and axle B, Fig. 1, of left-hand wheel. Confine the seed-box J, as shown in Figs. 1 and 2. Select a slide for the kind of seed to be planted, as seen in Fig. 5, a brush composed of hair and india-rubber, the hair on the outside and rubber outside of the seed-box J. The rubber is attached to an iron slide, the same as the brush. The rubber adapts itself to the motion of the seed-dropper to prevent the escape of small seed in the wrong time and place. In planting seed of different sizes the feed-slide is used to suit the size and amount of the seed to be planted. A thin slide is used for small seed and a thicker slide for large seed. To plant five feet apart, remove the small roller $f$ from the side of the wheel C, for a purpose which will now be explained, viz: K is a bifurcated lever suspended upon the arm $a'$ of the standard $a$. The lower ends of this lever are curved outwardly, so that as the wheel C is rotated the friction-rollers $ff$ on the side of C impinge upon the cam-surfaces of the lever-arms and cause these arms to oscillate back and forth. On one of the arms of lever K is attached, at $k$, the connecting-rod L of the slide $l$, Fig. 5, or any one of the slides which may be used, each being joined to the connecting-rod by a hinged joint. As the cultivator is moved forward, which may be done by the horse-power in front, or in small cultivators by hand in shoving by the handles, the wheel C rotates and turns the friction-rollers $ff$ under the lever-arms, giving two motions to each revolution, and according to the distance apart of these rollers so will be the distance for the dropping of the seed. By removing one of them, as stated above, only one movement of the lever and connecting-rod will take place to each revolution of wheel C. When both friction-rollers $ff$ are on the wheel C, the distance will be only two and a half feet. The point for opening the furrows for the seed is to be attached to the short beam A', as usual, and the covering-points or shovels to the loop I on the beams H.

This machine can be used for cultivating the ground after the plants are in a condition for such work. Fig. 6 represents one beam and arrangement for one point and one roller.

Fig. 7 represents two beams, two rollers, and the two middle beams, altogether making four beams and four points to be attached. The straps in Fig. 7 connect two beams and a clevis to each strap.

I claim—

In a seed-planter, the frame A A', having the standard $a$, upon which is mounted the bell-shaped depending lever K, provided with the connecting-rod L and its attached seed-dropping mechanism, in combination with the wheel C $f$, as and for the purpose set forth.

In testimony whereof I affix my signature in presence of two witnesses.

JAMES F. HILL.

Witnesses:
I. L. POPE,
JOHN H. HILL.